May 13, 1941. W. C. MUNROE 2,242,139
METHOD AND APPARATUS FOR WATER PURIFICATION
Filed March 25, 1938 2 Sheets-Sheet 1

Inventor
Walter C. Munroe
By Wilkinson & Mawhinney
Attorneys.

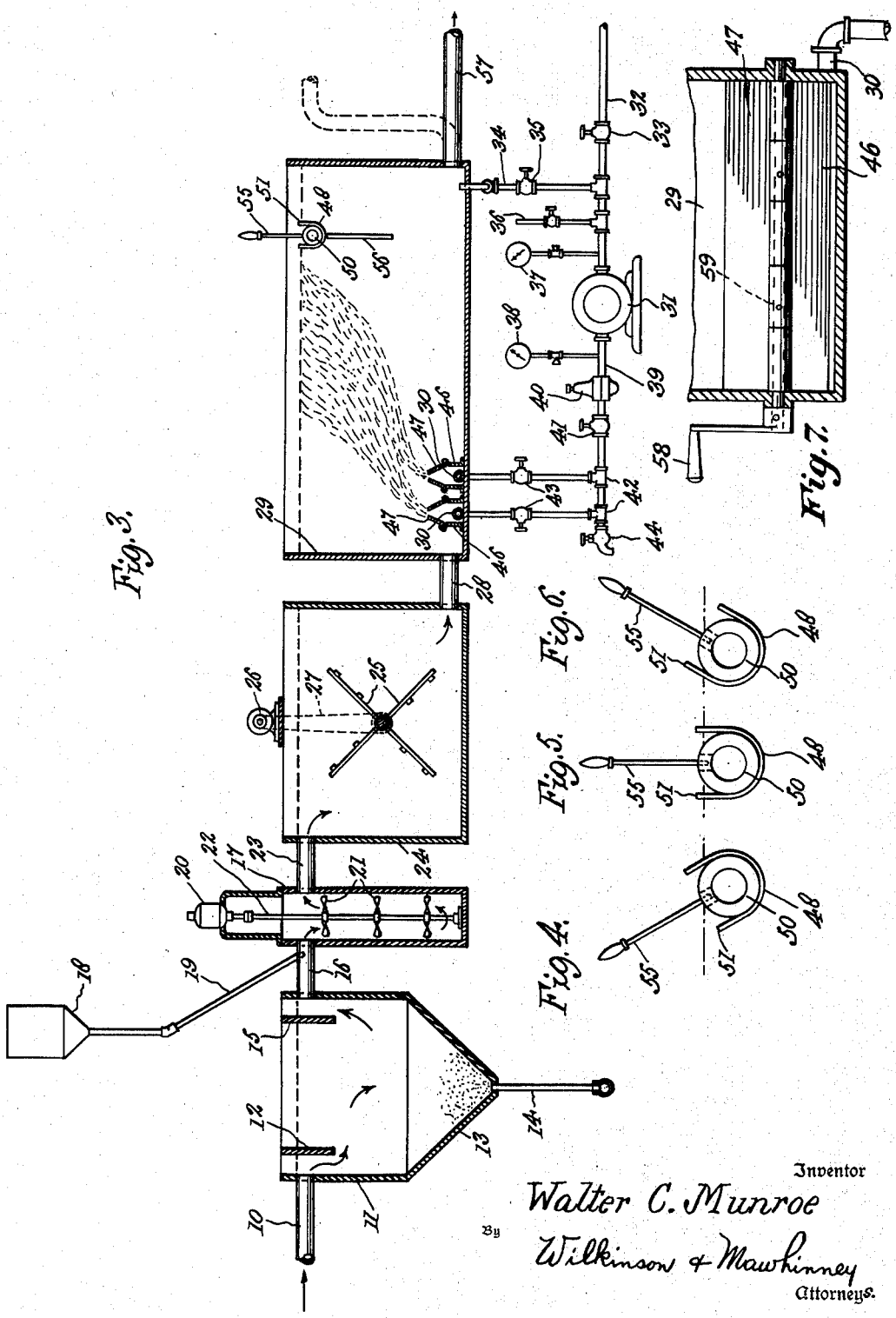

[10. LIQUID SEPARATION
—OR PURIFICATION.
16  Patented May 13, 1941

2,242,139

UNITED STATES PATENT OFFICE 2,242,139

METHOD AND APPARATUS FOR WATER PURIFICATION

Walter C. Munroe, Annapolis, Md.

Application March 25, 1938, Serial No. 198,148

8 Claims. (Cl. 210—16)

The present invention relates to improvements in a method and apparatus for water purification. The invention refers particularly to the treatment of water for the removal of the precipitate or floc formed by the addition of a coagulant.

In the ordinary commercial purification of water a natural source of raw water is first treated to remove suspended bulk materials such as gravel and sand and then the water is treated with a material which forms a large bulk of floc or light precipitate. The customary coagulants or flocculators are alums, ferrous sulphate and lime, ferric chloride, sodium aluminate, and chlorinated copperas. The most common of these is alum. The water mixed with the coagulant is agitated to disperse the coagulant and initiate flocculation after which the mixture is led into a large settling tank where it is allowed to remain in a quiescent condition until the light fluffy precipitate gravitates to the bottom of the tank and carries with it most of the undesirable impurities found in the raw water. After settling which takes from one to forty hours with an average time of about five and one-half hours, the floc together with the entrained impurities is found at the bottom of the tank whence it must be removed from time to time. The clarified water remains at the upper portion of the tank and may be decanted off and treated further to render it potable. After-treatments usually include filtration through sand beds and disinfecting which is usually accomplished by means of chlorine or a chlorine forming substance.

The present invention aims particularly at the coagulating portion of the procedure. The known process set out above has the grave disadvantage that a large settling basin capable of holding the water in a quiet condition from one to forty hours must be provided. Such basins are very expensive to construct and occupy a large amount of space. Another disadvantage is that the floc or precipitate collects on the bottom of the tank and its removal is a matter of considerable difficulty. Variations in temperature and the composition of the water treated change the efficiency of the settling tank within a wide range and make it necessary to provide an oversize tank or to carry on the sedimentation over a much longer period of time under certain conditions.

It is seldom if ever economically practical or consistent, even under the most favorable conditions, to provide settling basins of sufficient capacity and volume for the complete removal of coagulant matter by sedimentation alone. Accordingly, the series of expensive sand filters or other filters are necessary to remove the lighter and difficultly settling portions of the floc.

An object of the present invention is to provide a method of water purification which eliminates the step of sedimentation and substitutes a more rapid and efficient step.

Another object is to provide a method wherein a mixture of coagulant and water is treated to cause the floc to ascend to the surface whence it may be scraped or decanted off.

A further object is to treat a mixture of water and coagulant with air in a very intimate mixture with water in order that very small particles of air are caused to rise slowly through the water and the floc and buoy up the floc to the surface.

A still further object is to treat water and coagulant with water having air dissolved and intimately mixed therewith.

A still further object of the invention is to provide water purifying apparatus in which the device for removing floc is compact and highly efficient and provided with means for removing floc from the surface of a body of liquid.

Another object is to provide a floc removing tank with a pump for delivering intimately mixed air and water into the bottom of a body of water and coagulant in the tank.

Other objects relate to specific features of the apparatus for removing floc from the surface of the liquid and to the apparatus for introducing the air and water mixture into the liquid.

The method contemplated herein consists in applying to a mixture of water and coagulant, which may be formed according to the conventional method, a very finely divided portion of air which slowly passes up through the overlying body of liquid and serves to buoy up the light floc particles. Although it is known in mineral separation and some phases of sewerage purification to inject air into a body containing suspended matter it has been found that air injected into flocculated water is not efficient and it is essential that the air be subdivided to a very fine state. The preferred mixture of air is obtained by a mixing of air with a quantity of water in order partially to dissolve the air in the water. The partly dissolved and partly mixed body is then injected into the water which has been treated with the coagulant. The air is gradually released from the water in which it was dissolved and in which it was mixed and ascends in very small bubbles to the surface of the treated water. In its rise through the water the air attaches itself to the small floc particles and buoys or balloons them to the surface. It will be seen that the above described air mixture is a much finer subdivision than could be obtained by the injection of a jet of air into the treated water.

The commingling of air and water has been accomplished by admitting a carefully regulated portion of air to the low pressure side of a water pump, such as a centrifugal pump. The air is drawn into the water at the low pressure side and, at the high pressure side of the pump a large portion of the air dissolves in the water due to the increase in pressure. When this mixture and solution is injected into a body of treated water, the pressure is released and the dissolved air tends to evolve in the form of bubbles.

The floc which is carried to the surface forms a thick scum or layer which is readily removed by any one of a number of obvious expedients. Any form of scraper may be used or the scum may be allowed to run over a weir. The subjoined description relates to a preferred stucture of weir.

It is found that the time taken for the removal of floc by this method is very greatly less than the time taken by the former method of sedimentation. The tank in which the flotation is performed may be much smaller than the sedimentation tank and the liquid may move more rapidly through the tank since gravity is not relied on to perform the separation.

The intimate mixture of air and water causes another result to take place and that is because of the subdivision of the air particles that remain in contact with the water for a substantial interval of time instead of shooting immediately to the surface. Objectionable gases in water are removed by the passage of air and the water is aerated and becomes more lively as distinguished from flat or de-aerated water.

Referring now to the apparatus contemplated for use in carrying out this method, in the following figures the same numerals refer to like or corresponding parts wherein, Figure 1 is a top plan view of a tank for use in the flotation of floc.

Figure 3 is a diagrammatic representation of a system for water purification showing the components in longitudinal section.

Figure 4 is an enlarged end view of the weir shown in the other figures in which the weir is tilted to the left.

Figure 5 is a view similar to Figure 4 in which the weir is in vertical position, and Figure 6 is a view similar to Figures 4 and 5 in which the weir is tilted to the right.

Figure 7 is a vertical sectional view showing means for adjusting the baffles to control the flow of air-water mixture into the floc removing tank.

Figure 1:
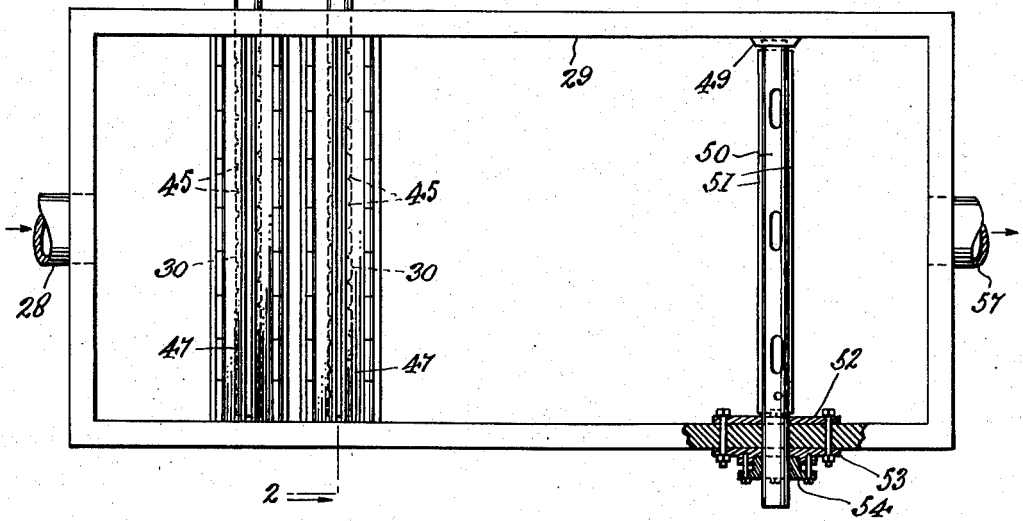

Referring first to Figure 3, raw water from any available source is drawn into the device through the pipe 10 and passes into the preliminary settling chamber 11 against a baffle 12. The water falls in the chamber 11 and the heavier particles settle out on the conical bottom 13 of the chamber from which they are removed through a pipe 14. The settled water is drawn off behind the baffle 15 through the pipe 16 which conducts it to an agitator 17. In the form shown, a supply of alum or other coagulant is carried in the hopper 18 and is fed into the water through a pipe 19 which enters the pipe 16 near its outlet into the agitator 17. The agitator 17 is of well known design and includes a drive means such as the motor 20 and a number of agitators or propellers 21 coupled to the motor 20 by means of the shaft 22. In the agitator the water and alum or other coagulant are thoroughly mixed in a rapid manner. For this purpose the action of the blades or propellers 21 is to force the fluid toward the bottom of the agitator so that the alum and liquid remain in contact a substantial time. The mixture is withdrawn from the top of the agitator through a pipe 23 into a further mixing chamber 24 in which a slow moving paddle 25 is rotated, for example by the motor 26 and chain or belt drive 27. In this chamber a mild agitation is continued to complete the mixing of coagulant and water and to disburse the floc which is forming throughout the water. The water is then withdrawn from the lower part of the mixing tank 24 through a pipe 28. Up to the present time all of the apparatus shown and all of the steps performed are conventional. From this point further the method and apparatus of the present invention occur.

A floc removing tank 29 is supplied with thoroughly mixed water and flocculated or coagulated through the pipe 28 which enters the tank 29 at the lower portion thereof. The water with the floc suspended is allowed to fill the tank 29. Transversely of the bottom of the tank 29 are a pair of air and water injectors or sprays 30. The sprays are connected to the high pressure side or the delivery side of a pump 31 which is indicated as a rotary pump and is driven by any suitable power source. The low pressure side of the pump 31 connects through a pipe 32 to a source of purified water. The pipe 32 is designed for use in supplying water at the beginning of a deflocculating operation when the tank 29 is empty. The pipe 32 may be closed off from the pump by means of the valve 33. In the course of continuous deflocculation it is intended that the pump 31 be supplied with water purified in the tank 29. For this purpose a pipe 34 enters the tank 29 at the opposite end from the delivery pipe 28. The pipe 34 is valved as at 35 for the control of the water supply. Still on the low pressure side of the pump 31 is a valved pipe 36 which is open to the atmosphere and which is adapted to be opened for the purpose of admitting a carefully regulated quantity of air into the water. A pressure gauge 37 is supplied between the water and air feeds and the pump in order to assist in the regulation of the quantities of the two substances. The air and water are intimately mixed and agitated in the course of passage through the pump 31 and a large quantity of the air is dissolved by the action of increased pressure on the high pressure or feed side of the pump 31. The high pressure side of the pump has a second gauge 38 which furnishes an indication of the water and air delivered into the tank 29. The delivery line 39 of the pump is further provided with a pressure regulator 40 and a valve 41 for further control of the delivery. The nozzles 30 are connected into the delivery line by means of T's 42 or other suitable connectors. The nozzles 30 are provided with individual valves 43 by means of which one or both may be selectively employed. A sample cock 44 is placed at the end of the delivery line 39 for the purpose of taking samples of the air and water mixture from time to time.

Figure 2:
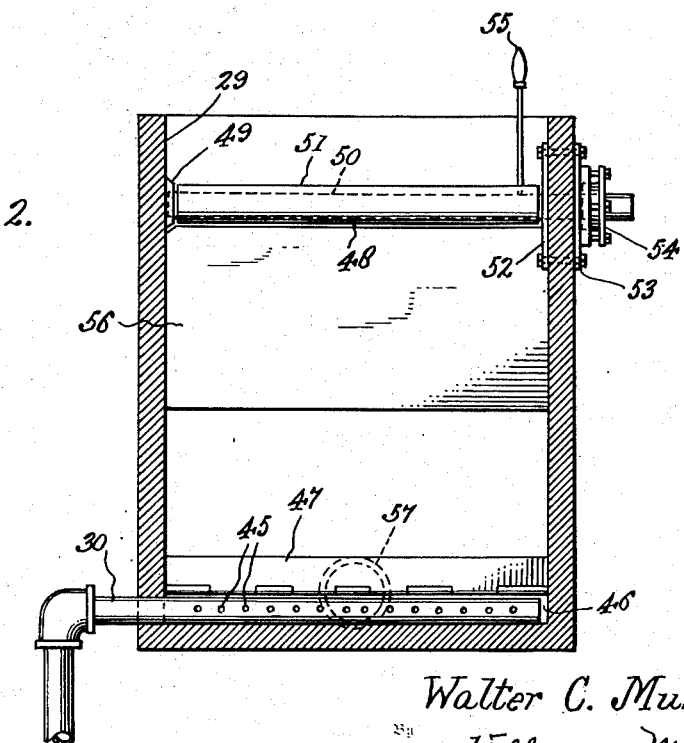
Figure 2 is a vertical section taken on the line 2—2 of Figure 1.

As seen in Figure 1, the nozzles 30 lie transversely of the tank 29 and are provided on their opposite sides with a series of perforations 45 which are better shown in Figure 2. Each of the nozzles 30 is provided with an individual baffle casing which consist of fixed vertical side walls 46 and hinged top walls 47. With the tank 29 filled with water a body of the water will lie within the baffle casing around the nozzles 30 so that air and water ejected from the nozzles is caused to commingle with a larger portion of water before entering the main body in the tank. The hinged top walls 47 of the baffle casings permit the adjustment of the openings into the tank from the casings so that the time of contact of the entering air and water with the water enclosed within the casings is subject to variation. This adjustment is obtained by means of the partial rotation of the handle 58 secured to the shaft 59 which in turn operates the hinged top walls 47 of the baffle casings, or by any other conventional operating means.

At the upper part of the tank 29 and located remotely from the inlet end connected to the pipe 28 is a weir 48 for the purpose of draining off the scum or floc which accumulates at the surface. In the form shown this weir 48 is of particular construction in that a tube or pipe of large diameter 50 is journalled at one side in the bearing 49 on the inner wall of the tank 29 and at its other side passes through the opposite wall of the tank. The tube 50 is partially encircled by a U-shaped channel 51 the straight sides of which extend in parallel relation above the top of the tube 50. The tube 50 is perforated and hollow so that the floc or scum passing over the straight walls of the channel 51 will drain off at the outer end of the tube 50 which projects from the side of the tank 29. The end of the tube 50 which passes through the side wall of the tank 29 is supported by an inner bearing plate 52 and an outer bearing plate 53 of the tank, the outer plate being provided with a gland 54 for the purpose of sealing the opening through the tank. The tube 50 is freely rotatable in its bearings and is provided with means for rotation such as the handle 55 as shown. This handle is located near a wall of the tank 29 so that an attendant can walk along the wall and reach the handle in order to rock the weir in any desired direction. Of course, it is obvious that any number of other mechanical means may be used to control the movement of the weir.

Figures 4, 5 and 6 show the weir in three positions of rotation. In order to decant or remove the scum without drawing off substantial portions of the clarified liquid it is desirable to have the effective height of the weir variable and for that reason the weir is formed in the manner just described. The lip of the weir is one of the top edges of the straight sides of the channel 51. This lip may be at either side of the weir depending on the direction in which the weir is rotated. Figure 4 shows the left hand edge employed as the lip, while Figure 6 shows the right hand edge employed for the same purpose. If desired the weir may be left in vertical position and the scum allowed to accumulate to a sufficient level to run over both of the lips simultaneously and drain off.

The tank 29 may be provided with a transverse baffle 56 which extends across the tank below the weir 48 and provides a region of quiescence at the end of the tank.

The clarified water is withdrawn from the end of the tank opposite the supply end through a pipe 57 which leads to further conventional water treating apparatus such as chlorinators or filters if necessary. As shown in dotted lines in Figure 3 the pipe 57 may be curved upwards in order to reduce the effective head of the tank instead of being parallel with the lower wall of the tank as shown in full lines.

The operation of the device is, after the preliminary settling and the addition of the coagulant, to deliver water through the pipe 28 into the separating tank 29. The pipe 57 will, of course, be closed until the level of the water arrives near the weir 48. When a sufficient depth of water is obtained, the pump 31 is started, the valve 35 closed and the valve 33 opened so that a quantity of purified water is drawn through the pipe 42 and delivered through the nozzles 30. The air inlet 36 is opened to admit a quantity of air sufficient to form an intimate mixture with the water and the mixture is carried into the body of water in the tank 29 through the nozzles. As the mixture of air and water reaches the region of lower pressure in the tank the air gradually separates from the water and rises slowly through the same. The very small size of the air bubbles make it possible to have the air arise very slowly. The arising air attaches itself to the small light particles of floc suspended in the water and buoys them to the surface where they collect as a scum. The effectiveness of the floc removing action can be observed by testing portions of the water in the tank below the surface and when substantial clarity is obtained the pipe 57 is opened and the water carried on through the rest of the process in the conventional manner. The scum at the top of the liquid is decanted off either by tilting the weir or otherwise from time to time as needed. If necessary manual or other scrapers may be employed to collect the scum in the region of the weir. Figure 3 shows in dotted lines the passage of air when the tank is in full operation with the water passing continuously through it. As a matter of fact, the very small bubbles of air will be found in every part of the tank since the dissolved air is liberated from the water which is injected into the tank only after a considerable interval of time.

The tank 29 is capable of continuous operation since nothing accumulates on the bottom and it is not necessary to stop the process unless something unforseen occurs to damage the apparatus. There is no body of accumulated floc to contaminate fresh water entering the tank. It is not necessary to wait long periods of time for gravity sedimentation as was formerly the case. The composition of air and water injected through the nozzles 30 is capable of variation to meet changing conditions of turbidity and water composition.

It will be understood that the number and location of the injectors 30 is not critical and is subject to variation within wide limits. Likewise, the weir 48 may be located otherwise or a number of weirs employed. The conventional portions of the apparatus shown are merely inserted for the purpose of illustration and are in no way critical of this invention.

It is understood that wherever the term "air" is used it is also intended to include "gas" such as waste or stack gases.

The mixture of air and water may be obtained in various ways but the way disclosed is preferred because of the simplicity it permits and because it is readily variable and subject to close control.

It is obvious that various changes and modifications may be made in the details of construction and design of the above specifically described embodiment of this invention without departing from the spirit thereof, such changes and modifications being restricted only by the scope of the following claims.

What is claimed is:

1. A water purifying method which consists of the step of introducing a partially dissolved and intimately mixed body of air and water below the surface of water containing suspended floc while maintaining the water in a substantially quiet state whereby small air bubbles are absorbed by the suspended floc thereby changing the specific gravity of the suspended floc and float the floc to the upper surface.

2. A water purifying method which consists of the steps of adding a coagulant capable of forming a light suspended floc to raw water, passing the water and the coagulant into a floc removing chamber where the water is maintained in a substantially quiet state, and pumping a water and air mixture into the body of water in lower portion of said chamber, the coagulant absorbing the mixture to change its specific gravity to cause flotation of the floc.

3. A method of purifying water which consists of the steps of adding a floc forming coagulant to raw water, agitating the mixture to initiate precipitation, removing the mixture to a stirring chamber wherein the rate of agitation is substantially reduced, conducting the mixture to a floc removing chamber wherein the mixture is maintained substantially at rest, forming a dispersion of air in water by means of pressure and agitation, introducing said air in water dispersion into the lower portion of the flocculent mixture to release films of minute air bubbles which are absorbed by the coagulated material to change its specific gravity and float same to the surface, and removing the floc buoyed to the surface of the water by the passage of the released air bubbles through the mixture.

4. A method of removing flocculent precipitates in water purifying processes which consists of placing treated water containing suspended floc in a floc removing chamber wherein the mixture is maintained substantially at rest, forming a dispersion of air in water, controlling by pressure and agitation the air-water ratio in said dispersion, introducing the air in water dispersion in a stream into the bottom portion of said mixture to release minute air bubbles therein which are absorbed by the floc to change its specific gravity and buoy same to the surface, regulating the rate of flow of the air in water dispersion into the mixture by contraction of the said stream thereof, and removing the floc buoyed to the surface of the water by passage of the air bubbles.

5. In a water purifying apparatus, a tank for holding treated water which contains a flocculent precipitate, means for forming an intimate dispersion of air in water, distributing means for said air in water dispersion including perforated pipes positioned in the lower portion of said tank baffle casings having openings therein adjustably disposed about said pipes, and operating means for said baffles adapted to cause contraction and expansion of said openings for varying the amount of flow of the air in water dispersion into said treated water while maintaining the air-water ratio of the dispersion constant.

6. In a water purifying apparatus, receiving means for treated water containing a flocculent precipitate, agitating means for producing an intimate dispersion of air in water, distributing means for said dispersion so constructed and arranged in relation to said receiving means that the air in water dispersion is introduced into the lower portion of said treated water, a baffle casing having an adjustable opening into the receiving means and disposed about said distributing means, and operating means for said baffle casing adapted to cause restriction and enlargement of the opening therein to vary the amount of the air in water dispersion distributed into said treated water when the composition of the treated water varies without changing the air-water ratio in said dispersion.

7. A method of continuously purifying water which consists of the steps of adding a floc forming coagulant to raw water, agitating the mixture to initiate precipitation, removing the mixture to a stirring chamber wherein the rate of agitation is substantially reduced, conducting the mixture to a floc removing chamber wherein the mixture is maintained substantially at rest, forming a dispersion of gas in water by means of pressure and agitation, introducing said gas in water dispersion into the lower portion of the flocculent mixture to release films of minute bubbles which are absorbed by the flocculent mixture to change its specific gravity and buoy same to the surface, and removing the floc buoyed to the surface of the water by the passage of the released bubbles through the mixture.

8. A method of continuously purifying water which consists of the steps of adding a floc forming coagulant to raw water, agitating the mixture to initiate precipitation, removing the mixture to a stirring chamber wherein the rate of agitation is substantially reduced, conducting the mixture to a floc removing chamber wherein the mixture is maintained substantially at rest, forming a dispersion of air in water by means of pressure and agitation, introducing said air in water dispersion into the lower portion of the flocculent mixture to release films of minute bubbles which are absorbed by the flocculent mixture to change its specific gravity and buoy same to the surface, removing the floc buoyed to the surface of the water by the passage of the released bubbles through the mixture, and circulating a portion of the purified water from the floc removing chamber to form the dispersion of air in water.

WALTER C. MUNROE.